United States Patent [19]

Stanfill et al.

[11] 4,098,346

[45] Jul. 4, 1978

[54] STEERING FOR PLOW WITH ADJUSTABLE PLOW BOTTOMS

[75] Inventors: Ralph Everette Stanfill, Bettendorf; James Gerald Steinbach, Davenport, both of Iowa; Gary Allen Rehn, Andover; George Frederick Oelschlaeger, Rock Island, both of Ill.; William Wayne Jackson, Bettendorf, Iowa

[73] Assignee: Deere & Company, Moline, Ill.

[21] Appl. No.: 729,612

[22] Filed: Oct. 1, 1976

[51] Int. Cl.² .................................. A01B 69/00
[52] U.S. Cl. ................................ 172/283; 172/285; 172/291; 172/141; 172/647; 172/551
[58] Field of Search .............. 172/218, 283, 285, 291, 172/569, 287, 166, 576, 569, 647, 573, 572, 551, 166, 168, 144, 141

[56] References Cited

U.S. PATENT DOCUMENTS

| | | | |
|---|---|---|---|
| 829,558 | 8/1906 | Weeks | 172/283 |
| 2,564,567 | 8/1951 | Ego | 172/647 |
| 3,061,018 | 10/1962 | Olson | 172/166 X |
| 3,503,453 | 3/1970 | Johannsen | 172/212 |
| 3,503,454 | 3/1970 | Oerman | 172/265 |
| 3,543,864 | 12/1970 | Wenzel | 172/285 |
| 3,589,451 | 6/1971 | Wenzel | 172/285 |
| 3,910,353 | 10/1975 | Ralston | 172/1 |
| 3,918,528 | 11/1975 | Kinzebaw | 172/218 |
| 4,036,305 | 7/1977 | Kinzebaw | 172/647 |
| 4,036,306 | 7/1977 | Kinzebaw | 172/647 |
| 4,049,063 | 9/1977 | Dietrich | 172/647 |

FOREIGN PATENT DOCUMENTS

481,234  2/1952  Canada ........................ 172/166

Primary Examiner—Richard J. Johnson

[57] ABSTRACT

A plow having a main frame beam disposed in a diagonal direction with respect to the direction of travel and having a plurality of plow bottoms equally spaced along the diagonal beam, each bottom being vertically pivotally supported on the beam. A furrow wheel frame is carried on the rear of the beam to swing about a vertical axis. The plow bottoms and wheel frame are connected together and are power operated so that the plows may have their effective plowing width adjusted while at the same time positioning the furrow wheel frame. A hitch connection is carried on the forward end of the plow and is composed of a first part which is adapted for connection to a tractor and a second part which is rearward of the first part and adapted to shift with the plow frame. The two parts are connected by a vertical pivot to permit relative lateral swinging between the parts. Master and slave cylinders extend respectively between the first and second parts of the hitch and furrow wheel frame and the furrow wheel so that upon adjusting the width of cut of the plow bottoms on the go which would tend to shift the hitch parts relative to one another the position of the rear furrow wheel with respect to the wheel frame is automatically adjusted. The master and slave cylinders are so mounted and dimensioned that the rear wheel will automatically adjust itself with respect to the direction of travel in order to achieve desired steering of the rear wheel and resultant positioning of the rear position of the frame.

29 Claims, 8 Drawing Figures

STEERING FOR PLOW WITH ADJUSTABLE PLOW BOTTOMS

BACKGROUND OF THE INVENTION

It is known to provide a plow with a diagonal main beam and to support the plow bottoms on the diagonal frame on vertical pivots so that the plow bottoms may be adjusted. A power source is provided for turning all the plow bottoms in unison. Such a plow is shown in Canadian Patent No. 481,234. It is also known to provide such a frame with a hitch having a tractor vertical connection adjacent the tractor so that the plow may shift relative to the tractor when turning. Conventionally, linkages have extended between the tractor and the rear furrow wheel which cause the rear furrow wheel to steer as the tractor makes its turns. Such linkages are shown in U.S. Pat. Nos. 3,503,453, and 3,817,333. It is also known to provide a rear furrow wheel frame supported on the plow's main frame for swinging movement about a vertical axis so that the wheel frame may swing laterally relative to the main frame. On such plows, the more conventional types of wheel steering mechanism, as above referred to and shown in the above mentioned patents, are incorporated for steering the rear furrow wheel. Also, both of the latter patents provide for adjustable plow bottoms. In each of the latter patents the furrow wheel frame is supported on the vertical pivot on which the rearwardmost plow is mounted and does extend in a fore-and-aft direction. Also, the furrow or rear wheel is positioned in a fore-and-aft disposition and the steering linkages of both patents are composed of four bar linkages that maintain the wheels in such disposition. There are manual turn buckle adjustments for varying the lead of the furrow wheel, but the steering linkage maintains the wheel at the set lead regardless of the width of cut of the plows.

The problems that exist in the aforementioned types of plows is that the linkages for steering the rear wheel are not selfadjusting and consequently do not adjust the lead of the rear furrow wheel in a complimentary relation to various cuts of the plow bottoms. For example, when the plow bottoms are moved to an extremely wide cut it is normally desirable to turn the furrow wheel farther toward plowed ground. This is required for the reason that the wider the cut, the more tendency there is for the plow to move or shift laterally toward the unplowed ground. It would therefore follow that it is desirable in plowing wider cuts to turn the furrow wheel farther toward the plowed ground so as to absorb the greater landside forces. Similarly, as the plow cuts are narrowed, it is desirable to swing the furrow wheel left and in some instances to straighten the rear furrow wheel so that it is in general fore-and-aft disposition. This is one example of the desirability of having a different type of furrow wheel control than the conventional type of linkage extending between the tractor and the rear furrow wheel.

Further, the furrow wheel frame is carried on the main plow frame about a horizontal axis and hydraulic power means are provided to vertically adjust the rear wheel relative to the frame. Since the steering linkage is generally mounted on the main frame, each vertical adjustment of the main frame relative to the wheel frame has the effect of steering the furrow wheel. Such is not desirable and should be compensated for in some manner.

SUMMARY OF THE INVENTION

With the above in mind, it is the primary purpose of the present invention to provide a plow in which the plow bottoms are mounted on the main diagonal beam on vertical axes so that they may have their effective cutting widths adjusted. Provided on the rear of the plow is a furrow wheel frame, also supported on a vertical axis for swinging laterally. The plow bottoms and the furrow beam or frame are connected together and a hydraulic cylinder is utilized to swing the plow bottoms and the furrow wheel frame in unison but not in equal angular amounts.

The furrow wheel is supported on a spindle carried by the wheel frame so that the wheel may be guided. The plow frame has a hitch composed of a first part that is adapted to be mounted on and moved with the tractor and a second part that is directly connected to the main frame and is movable with it. The two parts are connected by a vertical pivot. A master cylinder extends between the first and second parts of the hitch and its slave cylinder is mounted between the furrow wheel and the furrow wheel frame. Therefore, any relative lateral movement between the two hitch parts is translated to a steering action on the rear wheel.

It is a further object of the present invention to provide the spindle on the wheel frame so that the axis of the spindle is at an angle to the general plane of the wheel so that an extension of the axis would engage the ground in the area in which the furrow wheel engages the ground. When viewed from the side the axis of the spindle is also inclined downwardly and rearwardly when the plow is in a working position and is substantially vertical when the plow is in transport position.

A further object is to so arrange the master cylinder and its connections to the respective parts as to minimize steering of the rear furrow wheel when the plow is adjusted vertically. Also, it is an object to locate the connections between the respective parts and with respect to the vertical pivot connecting the parts so that turning or steering of the rear furrow wheel occurs at a faster rate in turning to the right than when turning to the left.

DESCRIPTION OF A PREFERRED EMBODIMENT

The plow includes a main beam or frame 10 that extends diagonally with respect to the direction of travel and, as is conventional, has its front end 11 extending adjacent to the right rear side of a tractor 12. The frame 10 has a rear end 13 which carries a furrow wheel frame 14. The structure for mounting the frame or support 14 is shown generally in FIGS. 4 and 5 and is composed of vertical side plates 16, 17 that carries a horizontal pin 18 extending through the beam 14 and permits the beam 14 to swing vertically. The beam 14 is provided with an ear 19 and a hydraulic cylinder 20 has its rod end connected to the ear 19 and its base end pivotally connected at 21 to an ear that is fixed to the side plate 17. Welded between side plates 16 and 17 is a U-shaped strap 22 having upper and lower horizontal plates that receive a pivot pin 23. Extending out of the rear end 13 of the diagonal beam 10 is a rigid channel member 24 that also receives the pin 23. Consequently, the entire subframe 14 may shift laterally about the vertical pivot pin 23.

Figure 1:
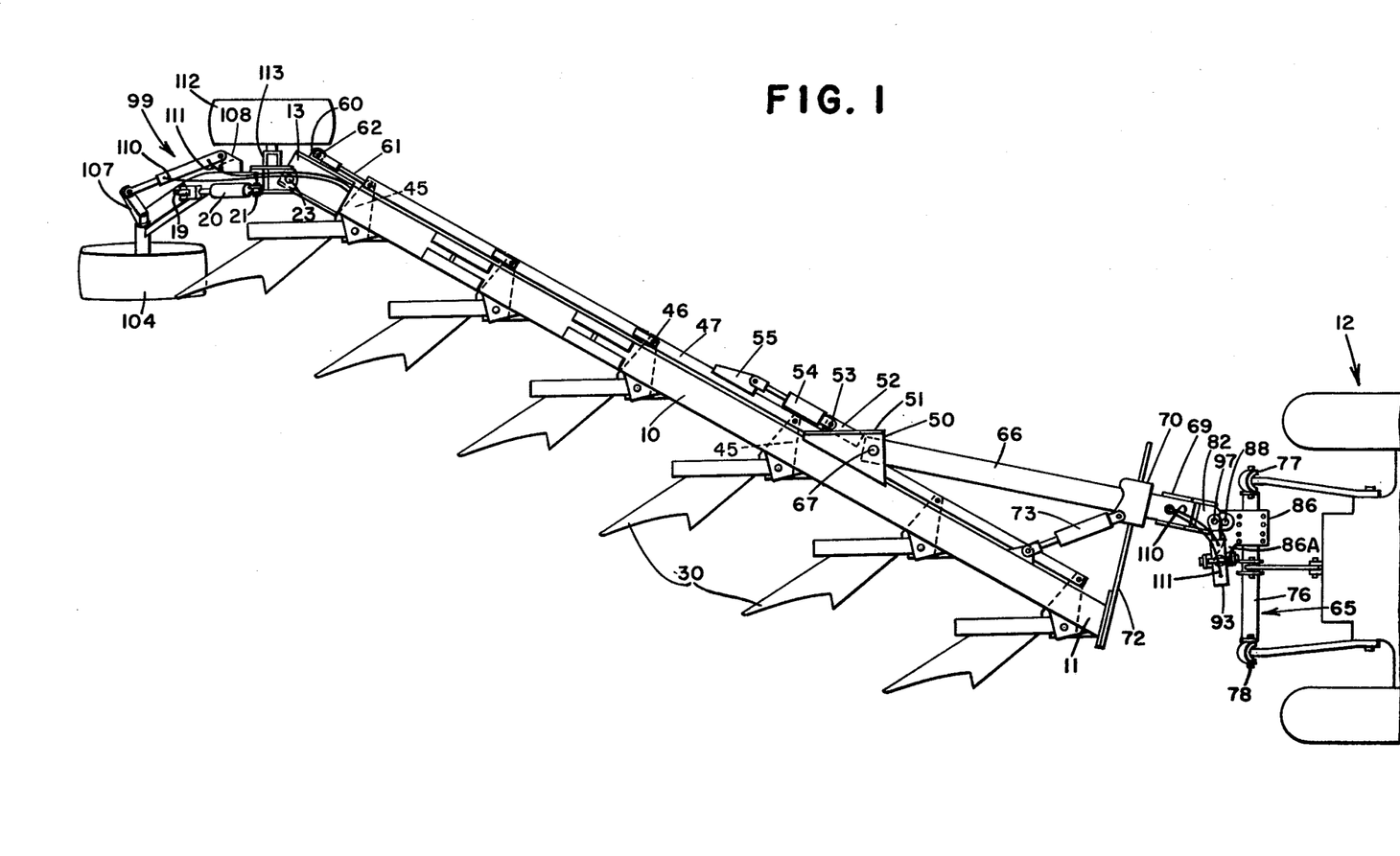
FIG. 1 is a plan view of a tractor-trailer plow utilizing the features of the present invention.

As can best be seen from viewing FIG. 1, identical plow bottoms 30 are arranged, beginning close to the forward end 11 and ending adjacent to the rear end 13 of the main frame. Each plow 30 is composed of a conventional plow-share and moldboard indicated at 31, the latter being fixed to a standard 32 which in turn is attached to a support structure 33. The structure 33 is pivoted at 34 to vertically bifurcated bracket structure 35. A safety trip mechanism 36, not of any importance relative to the present invention, extends between the bifurcated bracket 35 and the structure 33 and is pivotally connected at 38 to the bracket. The bracket 35 has upper and lower horizontal ears 39, 40 that extend forwardly. A U-shaped bracket 41, rigid on the beam 10, has upper and lower plate portions 42, 43 that respectively mate with the ears 39, 40. A vertical pin 44 extends through the plates 42, 43 and the ears 39, 40. An arm 45, which is attached to bracket 35, extends under the diagonal beam 10 and is connected by pivot pin 46 to an elongated link 47, composed of two link portions connected at adjoining ends, that is parallel to the beam 10 and extends substantially the full length of the beam. Each of the plow bottoms 30 is connected to the link 47 in identical manner. Consequently, as the link 47 is shifted all of the plow bottoms are adjusted. Welded to the upper and lower surfaces of the beam 10 are a pair of triangular shaped plates 50. The plates extend to the left side of the beam 10 and are interjoined by a vertical plate 51. Welded to the surface of the lower triangular plate 50 is an ear 52 which has pivotally anchored thereto at 53 a cylinder 54 that is utilized to adjust the width of cut of the plow bottoms 30. An ear 55 is fixed to the link 47 and receives the piston rod of the cylinder 54. As may be seen from viewing FIG. 1, extension and retraction of the cylinder 54 shifts all the arms 45 in unison and, consequently, adjusts the width of cut of all of the plow bottoms substantially equally.

Referring again to FIGS. 4 and 5, the lower horizontal portion of the U-shaped strap or plate 22 has fixed thereto an arm 60 which also underlies the beam 10 and extends to the left side of the beam. The rear end of the link 47 has a turn buckle type adjustable link section 61 that extends from the rear end of the link 47 to a pin 62 that connects it to the arm 60. The turn buckle 61 is for the purpose of adjusting the wheel relative to the furrow wall. It is clearly evident that each time the plow bottoms 30 are adjusted to a different width, the link 47 and its extension 61 causes the arm 60 and consequently the furrow wheel frame 14 to adjust about the pivot pin 23. Since the pivot pin 23 is rearwardly offset from the plow bottom pivot pin 44 of the rear plow bottom, it becomes clear that the rear wheel frame 14 is controlled by a non-parallel four bar linkage composed of a section of frame 10 between the pivot pins 23, 44, the arm 45 of the rearmost plow bottom, the arm 60 and the adjustable link 61. The arm 60 is shorter than the arm 45. Consequently, changes in angular position of the wheel frame relative to the main frame, while occurring simultaneously with adjustment of the plow bottoms, are not equal to changes in the angular positions of the plow bottoms relative to the main frame. Reviewing FIG. 1, it becomes clearly apparent that as the cylinder 54 is extended the rear frame 14 will swing counterclockwise to widen the cuts of the plow bottoms and at the same time to place the furrow wheel 104 carried thereon further from the furrow wall formed by the rear plow bottom. This is important for the reason that it is desirable to have the furrow wheel travel in the center of the furrow left by the rear plow bottom and the wider the cut the further the wheel should be from the furrow wall.

The main frame or diagonal beam 10 is connected to the tractor 12 by means of a hitch structure including a first or front portion 65 and a rear or second portion 66. The rear portion 66 is a fore-and-aft extending beam that has its rear end pivotally connected by pin 67 to the vertically spaced plates 50. The front portion of the beam 66 inclines downwardly at 68 and carries at its forward end connecting bracket structure 69.

Fixed to the inclined portion 68 is an upright bracket structure 70. The bracket structure 70 has a transverse horizontal opening 71 that receives a horizontal landing bar 72. The landing bar 72 is fixed to the forward end 11 of the main frame beam 10. The transverse bar 72 may shift laterally but not vertically in the bracket structure 70. Consequently, the bar 72 serves to stabilize the forward end of the main frame 10. A landing cylinder 73 extends between the bracket structure 70 and the main frame 10 and serves to adjust the angle between the rear hitch portion 66 and the main frame.

The front hitch portion 65 is composed of a vertical mast 75 that is attachable to the upper link of a conventional three-point hitch connection on a tractor. The mast 75 is carried in the central portion of a transverse beam 76 that has its opposite outermost ends provided with connecting elements 77, 78 for connection to the lower links on a tractor. It becomes apparent that the front hitch portion 65 is adapted for mounting on a tractor and to shift with the tractor as it turns.

The bracket structure 69 is composed of a pair of transversely spaced vertical plates 80, 81 that receives between them a knuckle member 82, the latter being pivotally connected to the plates by a transverse horizontal pin 83. The knuckle 82 has a pair of vertically spaced forwardly projecting ear portions 84, 85 respectively. Fixed to the cross bar 76 of the front hitch portion 65 is a pair of vertically spaced horizontal plates 86, 87 that project rearwardly and fit between the ears 84, 85. A vertical pin 88 extends through the ears 84, 85 and the plates 86, 87. Thus, the knuckle connection permits the hitch portion or part 66 to swing horizontally or laterally with respect to the front hitch portion 65 about the pin 88. Also, it is clearly apparent that the plow frame 10 is permitted relative vertical movement about the horizontal pin 83.

The plates 86, 87 have outwardly projecting plate portions 86a and 87a that have vertically aligned openings for receiving a stem portion 90 of a cylinder-carrying unit. This unit has an integral yoke 92 that opens upwardly to receive a cylinder 93 which, as will later become apparent, serves as a master cylinder of a master-slave cylinder combination. The cylinder 93 has an annular collar 94 fixed to its surface and the collar receives a pair of bolts 95 that extend through the legs of the yoke 92 and into the collar. The entire yoke and its master cylinder 93 may therefore swivel about the axis of the stem portion 90. The cylinder 93 is provided with a piston rod 96 which in turn is pivotally connected to the knuckle 82 by vertical pivot pin 97. Reviewing FIG. 7, it should be noted that the pin 97 is generally directly rearwardly of the pin 88 when the hitch member 66 is in a fore-and-aft disposition and the hitch member 65 is in a transverse portion. This situation occurs during the normal working or transport positions of the two hitch parts 65, 66. However, any relative turning between the hitch part 65 and the hitch part 66 creates movement of the rod 96 which, will later become apparent, creates an immediate movement of a slave cylinder 99 at the rear of the implement.

Figure 4:
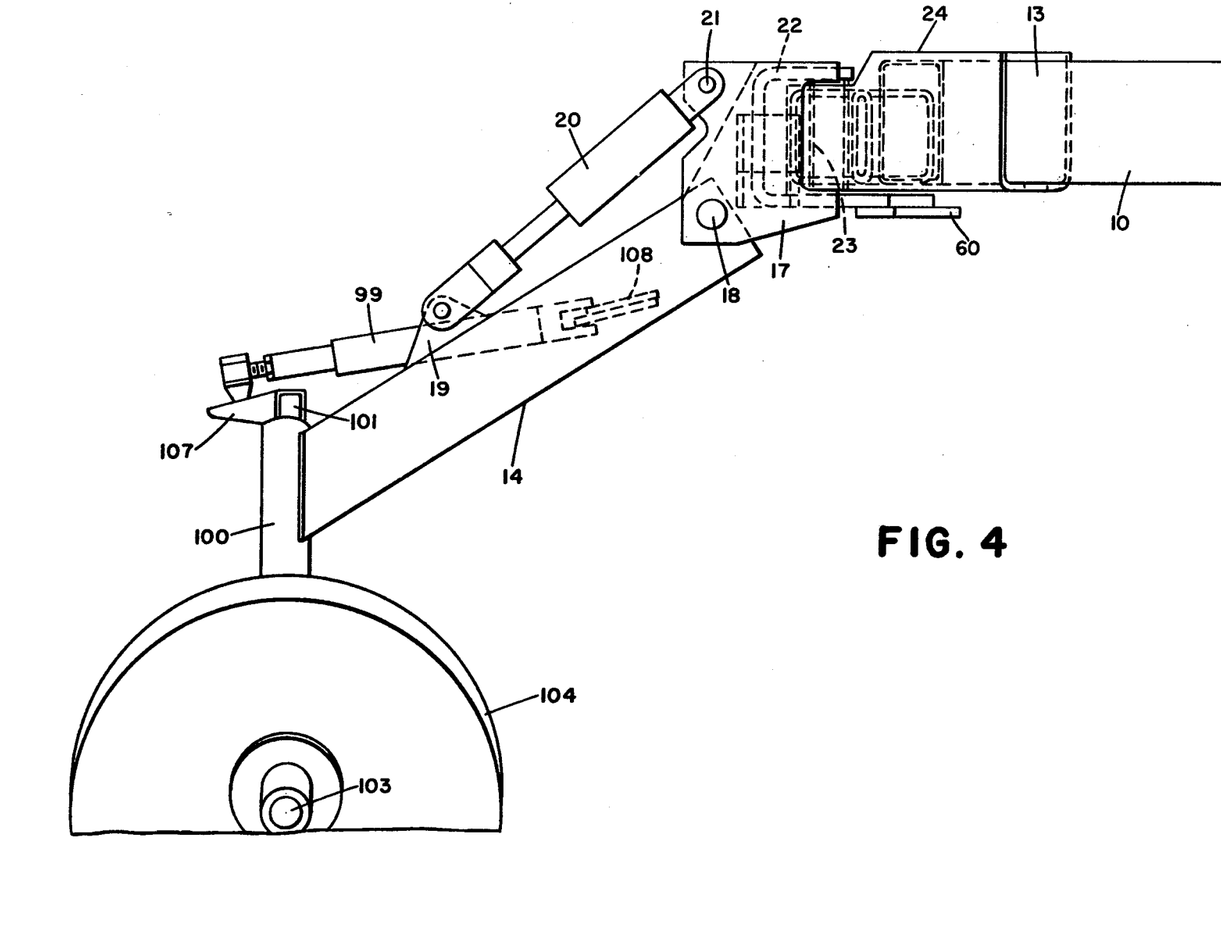
FIG. 4 is an enlarged view of the rear portion of the plow.
Figure 5:
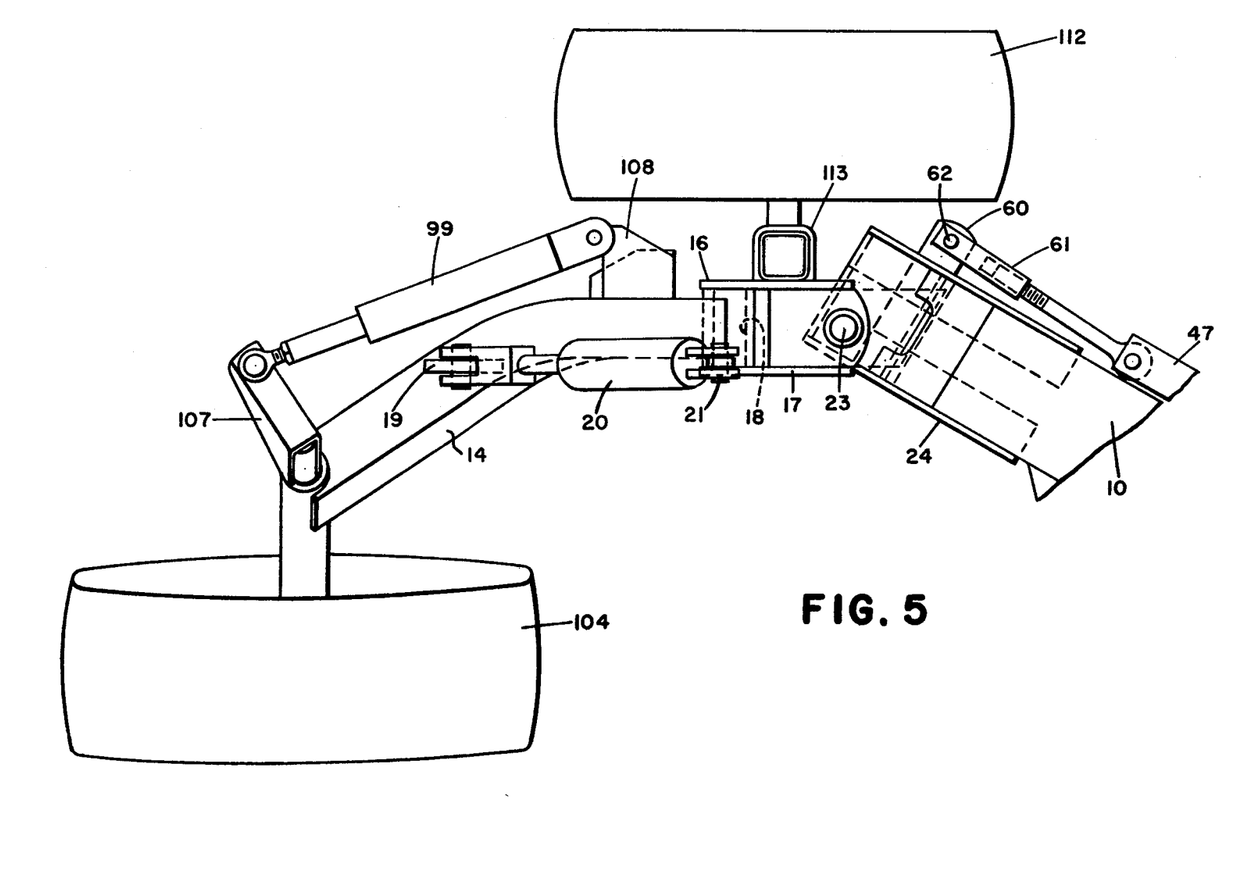
FIG. 5 is a plan view of the structure shown in FIG. 4.
Figure 6:
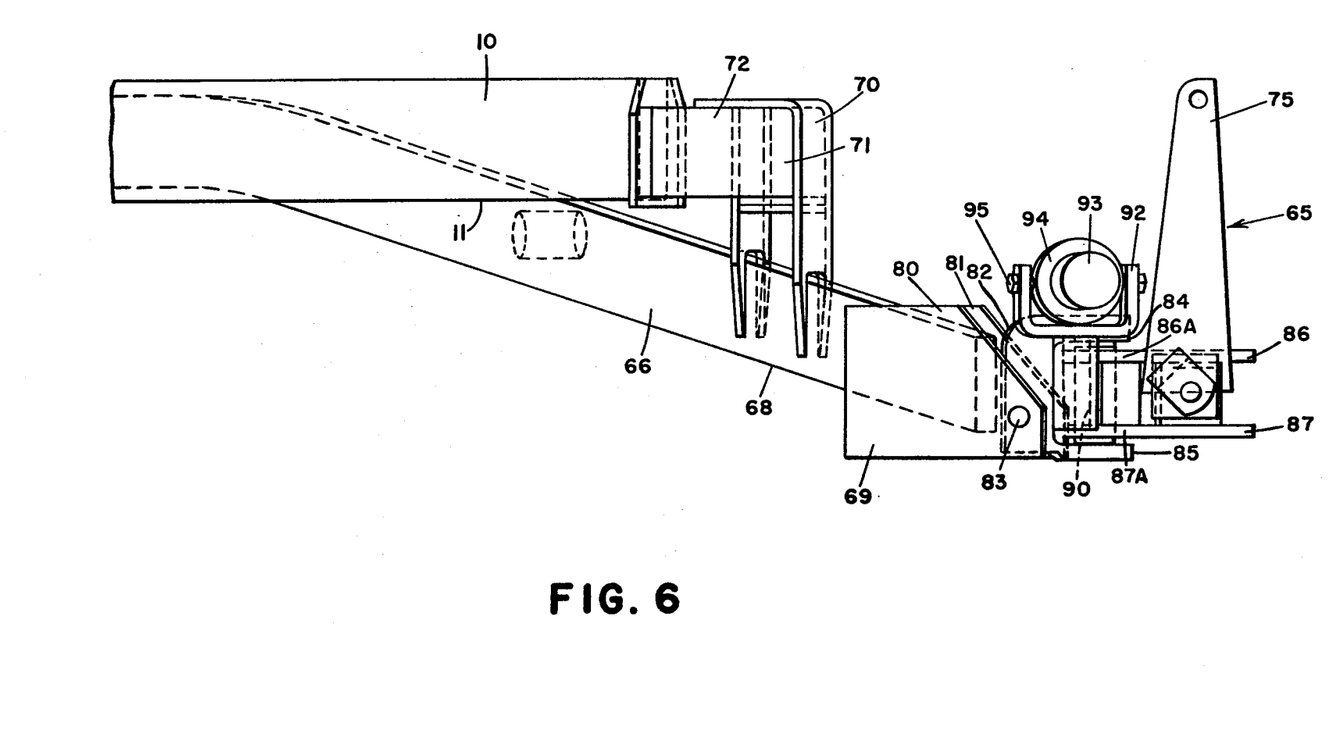
FIG. 6 is an enlarged side view of the hitch connection.
Figure 8:
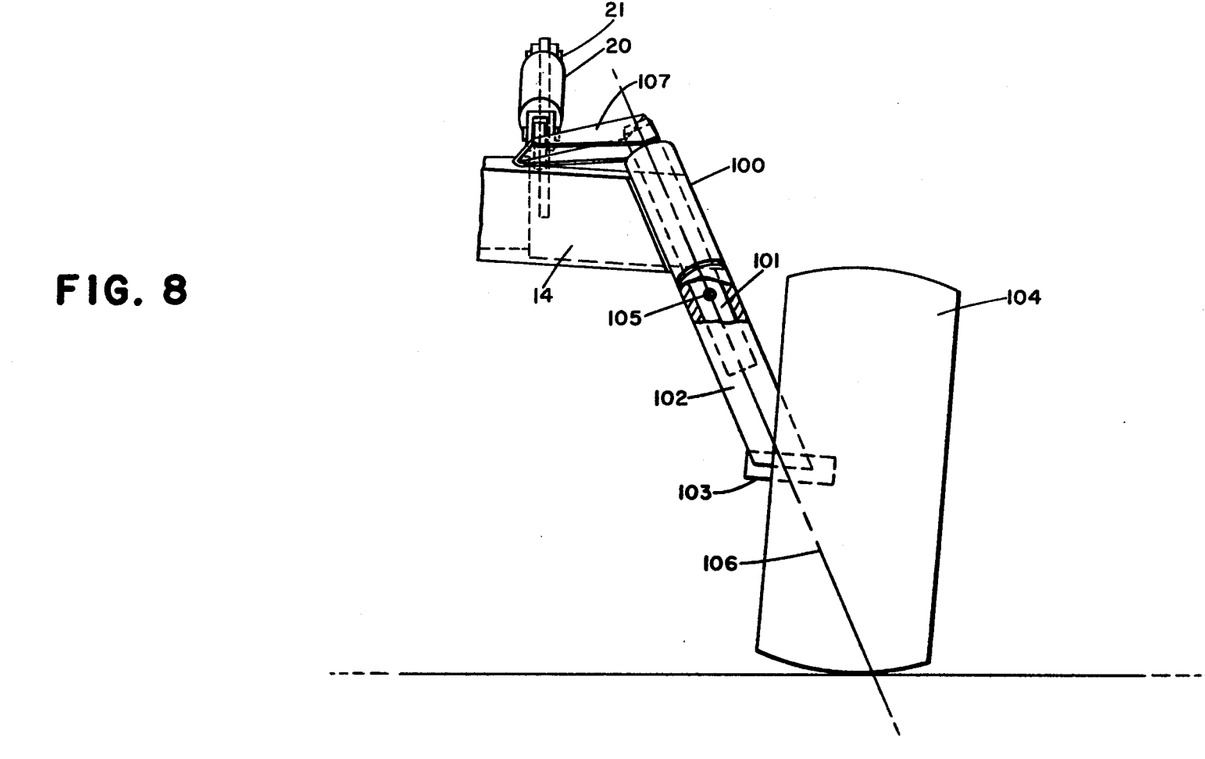
FIG. 8 is a rear view of the furrow wheel shown in FIGS. 4 and 5 when the plow is in working condition.

Referring now to the spindle and furrow wheel structure shown in FIGS. 4, 5, and 8 there is provided on the rear end of the furrow wheel beam or frame 14 a spindle tube 100 which receives the upper end of a spindle 101. The lower end of the spindle 101 extends into a second tube 102 which has its lower end fixed to a wheel shaft 103 that carries a furrow wheel 104. A pin 105 fixes the spindle 101 to the tube 102. Referring specifically to FIG. 8, it will be noted that the spindle extends at an angle to the plane of the wheel 104. An extension of the axis, as indicated at 106 would engage the ground in the area in which the wheel 104 engages the ground. The upper end of the spindle 101 has fixed thereto an arm 107 and the slave cylinder 99 has its piston rod connected to the outer end of the arm 107. The opposite or base end of the slave cylinder 99 is connected to the wheel support or frame 14 by means of an ear bracket 108. The importance of having the spindle 101 at an angle to the wheel 104 so that the axis 106 of the spindle engages the ground in the area of wheel contact with the ground is readily apparent. Should the wheel 104 when it is operating either in working or transport position, contact a stone or other foreign object there will be substantially no moment arm imparted into the spindle by the wheel since the axis of the spindle should be substantially on the stone or foreign object contacted by the wheel. Further, very little load is required in the slave cylinder 99 for angling the wheel 104 since it would generally be a swivel action between the wheel and ground. The rod of slave cylinder 99 is adjustable in length by a turn buckle connection to its connecting end for manually adjusting the lead of wheel 104.

It should also be noted that the wheel 104 is normally inclined or cambered toward the plowed side of the ground so that the underside tends to bite into the ground to resist landside forces created against the plow bottoms. Also, it should be noted that as the hydraulic cylinder 20 shifts the main frame 10 on the rear furrow wheel 104 so that the plow moves from its transport to its working position, the rear frame or beam 14 will tend to level out, thereby swinging the rear wheel rearwardly. Due to the shape of the beam 14 and inclination of the spindle 101 such movement of the frame 14 to the working position will cause the wheel to turn slightly or toe in with respect to the direction of travel so as to lead into the plowed ground. This feature is important because such leading or repositioning of the wheel absorbs the landside forces operating against the plow bottoms when they are in working position.

A gauge wheel 112 is provided adjacent the rear end 13 of the main beam and fixed to the side of the member 16 which is fixed to member 22 which is mounted on the vertical swivel pin 23. The gauge wheel 112 may be adjusted vertically on bracket structure 113 in a conventional manner. However, it should be recognized that the gauge wheel 112 will be adjusted along with the entire frame 14 as the plow bottoms 30 have their effective cutting widths adjusted.

The plow operates in the following manner. When the plow is in a transport position, as shown in FIGS. 1 and 4, the hydraulic cylinder 20 is extended so that the rear wheel frame 14 raises the rear end of the main frame 10. The rear frame 14 causes the spindle 101 to approach the vertical as viewed from the side (as in FIG. 4). This causes all the plow bottoms 30 to shift upwardly and out of contact with the ground. The tractor is then able to pull the plow bottoms in the transport position. When it is desired to move the plow into a plowing position, the lower links on the tractor are lowered and the hydraulic cylinder 20 is retracted which causes the main frame 10 to lower and the plow bottoms 30 to engage or cut into the ground. The right rear tractor wheel will normally move in the furrow left in the previous pass of the plow around the field. This causes the tractor to tilt approximately 6° to the right and such tilting action is imparted into the plow. Retraction of the cylinder 20, of course, causes the wheel frame 14 to move towards the horizontal position. The wheel will tend to tilt or camber to the left which will partially offset the tractor's 6° tilt when the tractor's rear wheel is in the furrow. It is desired to have the wheel cambered with respect to the ground and consequently the complete 6° tilting action will not be overcome due to the action of the rear frame portion 14. As mentioned previously, as the main frame 10 is shifted downwardly and as the rear frame 14 moves towards the horizontal, it will cause the rear furrow wheel 104 to swing slightly to the right and toe in or give a lead angle into the plowed ground. This is desirable and important because as the plow moves into the working position there are landside forces applied to the plow bottoms to shift the plow transversely to the left and the lead angle of the wheel will absorb some of these landside forces.

It is necessary that the front plow bottom 30 is positioned properly with respect to the previously plowed ground and consequently with respect to the tractor wheel. Should the front plow bottom 30 not be properly positioned the landing cylinder 73 may be adjusted from the tractor seat to properly position the front bottom.

In normal plowing the width of cut of the bottoms will stay the same. However, in some instances, due to low moisture soil or on dry hard soil, it may be desirable to adjust the cut in order to prevent the tractor from lugging down. This may be done from the tractor seat by adjusting the hydraulic cylinder 54. For example, if it is desired to increase the cut of the plow bottoms, the cylinder 54 is extended so as to swing the plow bottoms in a counterclockwise direction about their respective pivots and also swing the furrow wheel frame 14 about the pivot 23. Due to the additional cut of the plow bottoms, the rear end 13 of the main frame 10 will tend to swing clockwise to increase the overall width of the plow. This, of course, causes the rear hitch portion 66 to swing clockwise on the pivot 88 to thereby extend the rod 96 in the master cylinder 93. The rod end of the cylinder 93 is connected to the rod end of the slave cylinder 99 by a hose 110. Similarly, the base end of the master cylinder 93 is connected by a hose 111 to the base end of the slave cylinder 99. Consequently, as the master cylinder extends there is a resulting or complimentary retraction of the slave cylinder 99 which will cause the wheel 104 to turn in a clockwise direction on the spindle. Therefore, as the operator increases the cut of the plow bottoms there is a complimentary increased lead of the steering wheel to the right or toward the plowed ground. This increased lead is sufficient not only to overcome the normal angling of the wheel due to the swinging of its frame 14 but also sufficient to add additional lead to offset the additional landside forces caused by the increased cut of the plow bottoms. When the cut is decreased the opposite, of course, occurs. It should also be understood that once the cutting width is established and the tractor continues to move only forwardly, because the slave cylinder is mounted between the frame 14 and wheel 104, there is nothing that may occur on or to the plow, except turning between the tractor and plow, which will effect turning or steering of the wheel 104 on its spindle 101.

Figure 7:
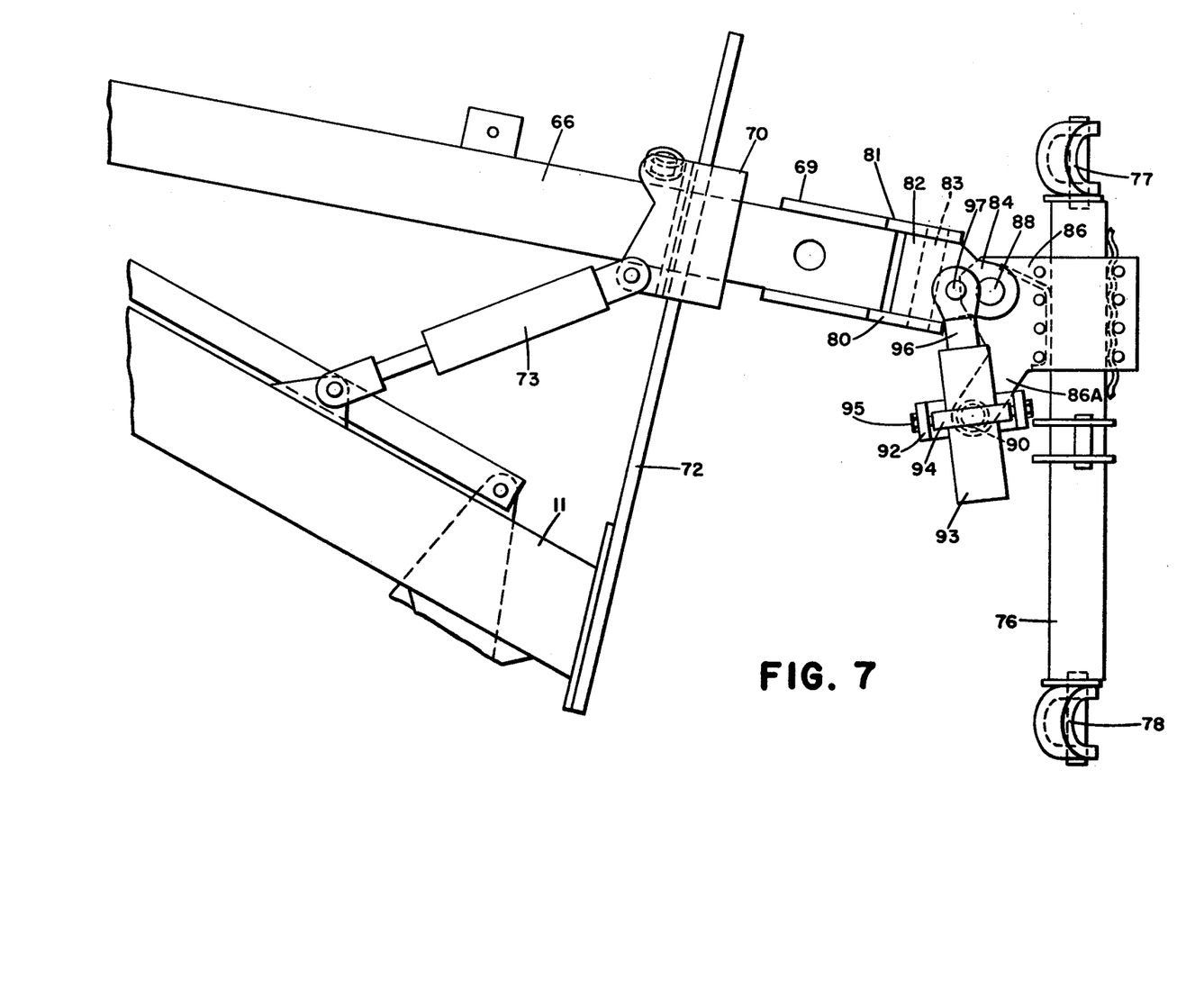
FIG. 7 is a plan view of the structure shown in FIG. 6.

Referring to FIGS. 1 and 7 it will be noted that in normal operation in which the tractor is moving directly ahead, the pin 97 is rearwardly of pin 88 and the axis of cylinder 93 and rod 96 is angled forwardly. The stem portion 90 of yoke 92 is rearwardly of the pin 88 although offset to the right. Therefore, turning of the tractor to the right will cause the cylinder 93 to move angularly clockwise about the axis of pin 88, to swivel about the axis of yoke stem 90, and to retract on the rod 96. Likewise, turning of the tractor to the left causes the cylinder 93 to move angularly counter-clockwise about the axis of pin 88, to swivel about the axis of yoke stem 90, and to extend on the rod 96. However, due to the relative positions of stem 90, pin 97, right-hand turning by the tractor form the position shown in FIG. 7 will cause greater axial displacement between the rod 96 and cylinder 93 than a similar degree of left-hand turning. This action will, of course, be translated to adjustment of slave cylinder 99. Therefore, when making a right-hand turn the furrow wheel 104 will lead left or toward the furrow wall a greater amount than the wheel will lead to the right or toward the plowed ground when making a left-hand turn. This feature is important because it causes the forward end 11 of the frame 10 to shift quicker to its new position to thereby delay or even avoid interference between the right rear tractor wheel and the front portion of the plow. Thus, the cylinder 93 and the rod 96 and the vertical pivots of pins 88, 97 and stem 90 ae so constructed and arranged to provide fast steering of wheel 104 when turning to the right in comparison to that of turning to the left.

Further, when turning either to the left or right, it is clear from viewing FIG. 7, which shows the tractor and plow in non-turning relation, that small or initial turning of the tractor will have the greatest adjustment in the master cylinder. This is because the axis of yoke stem 90 is offset substantially equal distance from both pins 97, 88 which are in a substantial fore-and-aft plane. Turning movement of the tractor causes the yoke stem 90 to shift along an arc struck from the axis of pin 88. Greatest adjustment of the rod 96 in the cylinder 93 occurs when the yoke stem moves in the portion of the arc directly to the right of pins 97, 88 or as shown in FIG. 7. Conversely the smallest adjustment of the rod 96 occurs when the yoke stem moves in the portion of the arc directly forwardly or rearwardly of the pins 97, 88. This feature has some importance for the reason that upon turning the tractor and plow, it is desirable that the steering wheel 104 be adjusted to swing the rear portion of the plow relatively fast as the tractor begins its turn so as to reduce the turn radius of the plow.

Figure 2:
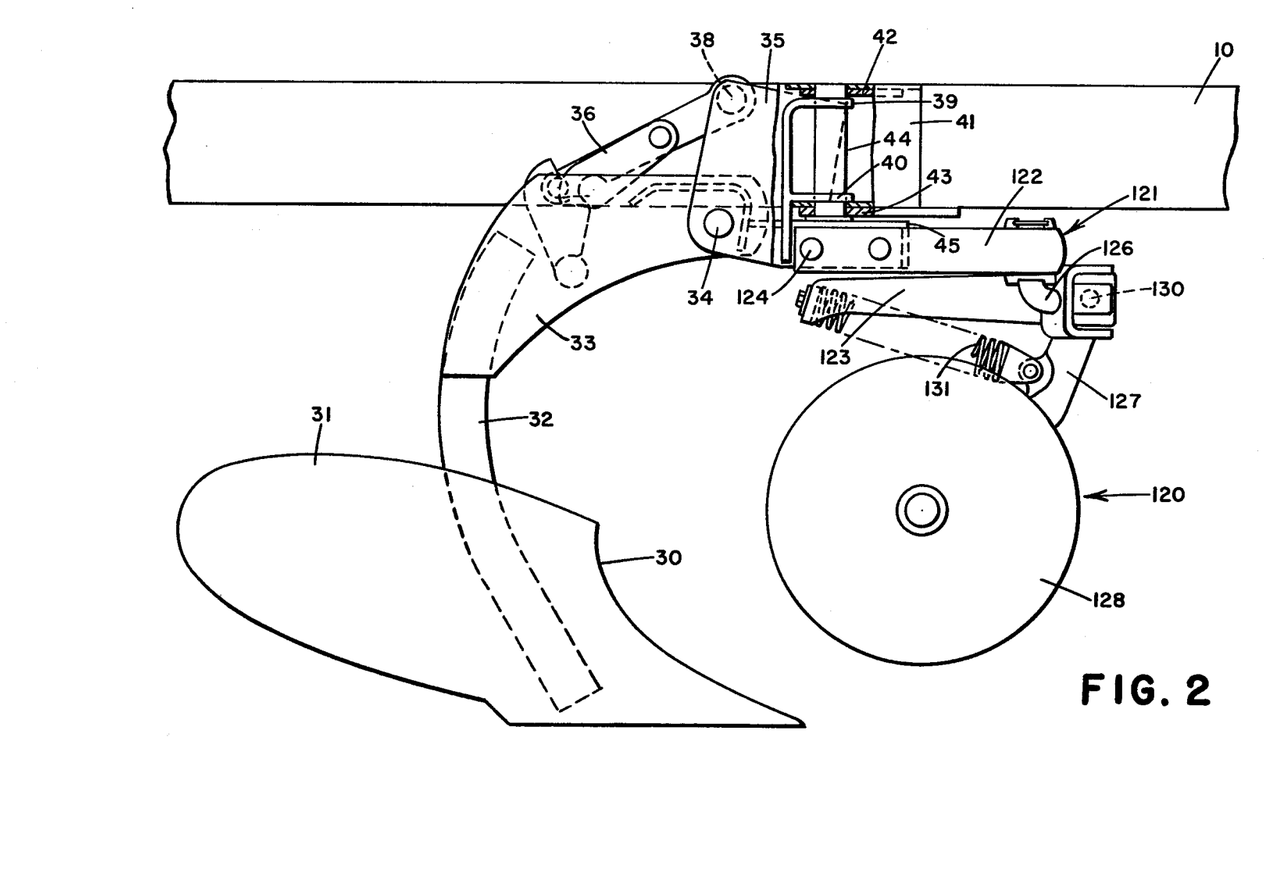
FIG. 2 is an enlarged side view, with portions broken away, showing a plow bottom and the manner in which it is mounted on the main frame of the plow.
Figure 3:
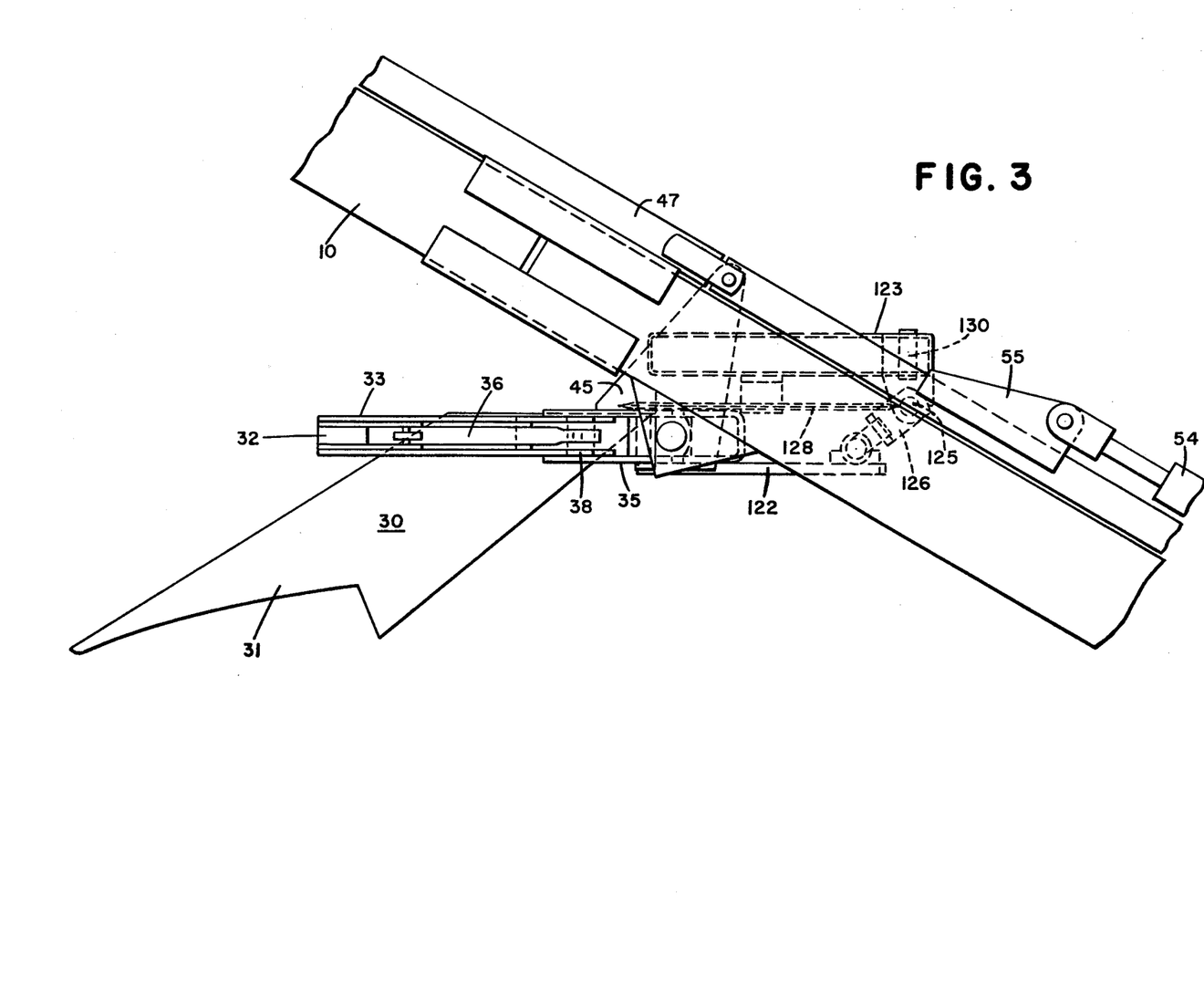
FIG. 3 is a plan view of the structure shown in FIG. 2.

Referring again to FIGS. 2 and 3, there is provided a coulter structure 120 composed of an overhead coulter frame 121 comprising upper and lower horizontal frame parts 122, 123. The part 122 is bolted at 124 to the bracket 35 so that the entire coulter swings with the plow. The part 123 is vertically pivotally connected at 125 so that the coulter can also swing independently of the plow 30. A bracket 126 interconnects the parts 122, 123. Carried on the frame member 123 is a downwardly and rearwardly extending coulter shank 127 that has a coulter blade 128 mounted on its lower end. The shank 127 is pivotally connected to the part 123 by a horizontal pivot pin 130 so that the blade 128 may swing upwardly and rearwardly. An upwardly inclined spring 131 has a lower end connected to the shank 127 and an upper end connected to the rear end of frame part 123. It should here be noted that as the blade 128 moves rearwardly and upwardly the spring will compress and exert a greater force. However, due to its inclination the effective moment arm will be reduced to thereby maintain substantially equal effective forces on the coulter as it shifts in a direction upwardly and rearwardly.

We claim:

1. A plow adapted to be pulled by a tractor comprising: a main frame extending diagonally with respect to the direction of travel between forward and rear ends; a fore-and-aft extending wheel frame supported at its forward end on the rear end of the main frame for lateral swinging movement about a substantially vertical axis; a steerable wheel assembly mounted on the rear end of said wheel frame; a hitch structure for connecting the main frame to a tractor including a forward portion connectible to a tractor and shiftable therewith, a rear portion connectible to the main frame and shiftable therewith, said forward and rear portions being connected to one another by vertical pivot structure permitting relative lateral swinging between the portions; a plurality of plow bottoms spaced along said main frame, each being vertically pivotally supported thereon, said vertical axis about which the wheel frame swings being offset rearwardly from the vertical axis about which the rearwardmost plow bottom is vertically pivotally supported; means connecting the plow bottoms and said wheel frame so that the plow bottoms and said wheel frame shift laterally in unison on said main frame; power means on the main frame connected to and for shifting said plow bottoms so as to selectively adjust the width of cut of said plow bottoms; and master and slave cylinders connected respectively to the forward and rear portions of said hitch structure and said wheel frame and wheel assembly for adjusting the latter in response to relative lateral swinging movement between the hitch portions.

2. The invention defined in claim 1 in which the master and slave cylinders are so constructed and arranged that they cause the wheel to swing clockwise and counterclockwise respectively as the width of cuts increase and decrease respectively and adjust the wheel's lead with respect to the plowed ground in increasing and decreasing amounts as the plow responds to increase and decrease cuts respectively.

3. The invention defined in claim 1 in which the means connecting the plow bottoms and said wheel frame are a plurality of parallel equal length arms connected to the respective plow and bottoms an arm connected to the wheel frame, and an elongated link extending between and connected to the parallel arms and the arm connected to the wheel frame, and whereby the arm connected to the wheel frame is of different length than the parallel arms so that the wheel frame is angularly adjusted by said power means a different amount than said plows.

4. The invention described in claim 3 characterized by the arm connected to the wheel frame being shorter than the parallel arms so that the wheel frame swings angularly a greater amount than the plow bottoms as they are adjusted to a wider cut.

5. The invention defined in claim 1 further characterized by said rear portion also having a transverse horizontal pivotal connection between said forward and rear hitch portions for permitting relative vertical movement between the plow and a tractor, said pivotal connection being offset rearwardly of the vertical axis of the vertical pivot structure, and said master cylinder being connected to shift with said rear portion in the offset between the vertical axis and horizontal pivotal connection whereby any relative vertical movement between said forward and rear portions will not effect adjustment of the master and slave cylinders.

6. The invention described in claim 1 characterized by that portion of the main frame between the vertical axes about which the wheel frame and rearwardmost polow bottom swing is one link of a four bar linkage controlling the movement of the wheel frame, the other links of the linkage being a horizontal radial arm swingable with the respective plow bottom, a horizontal arm swingable with the rear frame, and a link connecting the two arms.

7. The invention described in claim 6 in which the link is extensible and retractable thereby permitting the linkage controlling the wheel frame to be adjustable to position its wheel in conformity to various soil characteristics.

8. A plow adapted to be pulled by a tractor comprising: a main frame extending diagonally with respect to the direction of travel between forward and rear ends; a fore-and-aft extending wheel frame supported at its forward end on the rear end of the main frame for lateral swinging movement about a substantially vertical axis and for vertical movement about a substantially horizontal axis; a steerable wheel assembly carried on the rear end of said wheel frame; a hitch structure for connecting the main frame to a tractor including a forward portion connectible to the tractor and shiftable therewith, a rear portion connectible to the main frame and shiftable therewith, said forward and rear portions being connected to one another by vertical pivot structure permitting relative lateral swinging between the portions; a plurality of plow bottoms spaced along said main frame, each being vertically pivotally supported thereon, and with the rearwardmost plow bottom having its vertical pivotal support forwardly of the vertical axis about which the wheel frame swings; means connecting the plow bottoms and said wheel frame so that the plow bottoms and said wheel frame swing in unison but with the wheel frame swinging angularly a greater amount than said plow bottoms; power means on the main frame connected to and for shifting said plow bottoms so as to selectively adjust the width of cut of said plow bottoms; and master and slave cylinders extending respectively between the forward and rear portions of said hitch structure and said wheel frame and wheel assembly for angularly adjusting the wheel assembly in response to relative lateral swinging movement between the hitch portions.

9. A plow adapted to be pulled by a tractor comprising: a main frame having forward and rear ends; a fore-and-aft extending wheel frame supported at its forward end on the rear end of the main frame for lateral swinging movement about a substantially vertical axis and for vertical movement about a substantially horizontal axis; a wheel spindle on the rear end of said wheel frame; a wheel mounted on the spindle; a hydraulic cylinder extending between the main frame and the wheel frame for raising and lowering the latter; a hitch structure for connecting the main frame to a tractor including a forward portion connectible to the tractor and shiftable therewith, a rear portion connectible to the main frame and shiftable therewith, said forward and rear portions being connected to one another by vertical pivotal structure permitting relative lateral swinging between the portions; a plurality of plow bottoms equally spaced in a diagonal row along said main frame, and each being vertically pivotally supported thereon; means connecting the plow bottoms and said wheel frame so that the plow bottoms and said wheel frame shift angularly in unison but different angular amounts; power means on the main frame connected to and for shifting said plow bottoms so as to selectively adjust the width of cut of said bottoms; and master and slave cylinders extending respectively between the forward and rear portions of said hitch structure and said wheel frame and wheel spindle for angularly adjusting the wheel in response to relative lateral swinging movement between the hitch portions whereby the angular adjustment of said spindle is solely a function of the angular relation between said hitch portions as sensed by the master cylinder.

10. A plowing implement adapted to be pulled by a tractor comprising: a main frame having forward and rear ends; a fore-and-aft extending wheel frame supported at its forward end on the rear end of the main frame for lateral swinging movement about a substantially vertical axis and for vertical movement about a substantially horizontal axis; a wheel spindle on the rear end of said wheel frame; a wheel mounted on the spindle; a hydraulic cylinder extending between the main frame and the wheel frame for raising and lowering the latter; a hitch structure for connecting the main frame to a tractor including a forward portion connectible to the tractor and shiftable therewith, a rear portion connectible to the main frame and shiftable therewith, a connector element connecting said forward and rear portions to one another for relative lateral movement about a vertical axis and relative vertical movement about a transverse horizontal axis, the latter axis being rearwardly offset from the vertical axis; a plurality of plows equally spaced in a diagonal row along said main frame, and each being vertically pivotally supported thereon; means connecting the plows and said wheel frame so that the plows and said wheel frame shift angularly in unison; power means on the main frame connected to and for shifting said plows so as to selectively adjust the width of cut of said plows; and master and slave cylinders extending respectively between the forward portion of said hitch structure and the connector element in an area rearwardly of the vertical pivot and between said wheel frame and wheel spindle for angularly adjusting the latter in response to relative lateral swinging movement between the hitch portions whereby the angular adjustment of said rear wheel spindle is solely a function of the angular relation between said hitch portions as sensed by the master cylinder and is independent of the vertical position of the main frame.

11. In a plow, a main frame extending diagonally with respect to the direction of travel between forward and rear ends; a fore-and-aft extending wheel frame supported at its forward end on the rear end of the main frame for lateral swinging movement about a substantially vertical axis; a steerable wheel assembly carried on the rear end of said wheel frame; a structure supporting the forward end of the main frame and including first and second portions connectible to a forward towing structure and to the main frame respectively and shiftable therewith, said first and second portions being connected to one another by vertical pivot structure permitting relative lateral swinging between the portions; a plurality of plow bottoms spaced along said main frame, each being vertically pivotally supported thereon and with the rearwardmost plow having its pivotal support forwardly of said vertical axis; power means on the main frame connected to and for shifting said plow bottoms for selectively adjusting the width of cut of said plow bottoms; means connected to said wheel frame for shifting said wheel frame laterally on said main frame upon said power means adjusting the width of cut of said plow bottoms; and steering mechanism sensing relative lateral pivotal movement between said first and second portions of said structure and extending to and connected to the steerable wheel assembly for adjusting the wheel assembly in response to relative lateral swinging movement between the hitch portions.

12. A plow adapted to be pulled by a tractor comprising: a plow frame having forward and rear ends and connectible to the tractor to swing relative to the tractor about the axis of vertical pivotal structure; a fore-and-aft extending wheel frame supported at its forward end on the rear end of the main frame for lateral swinging movement about a substantially vertical axis and for vertical movement about a substantially horizontal axis; a steering wheel assembly on the rear end of said wheel frame; a hydraulic cylinder extending between the main frame and the wheel frame for raising and lowering the latter; a plurality of plow bottoms equally spaced in a diagonal row along said main frame, and each being vertically pivotally supported thereon and with the rearmost plow bottom being vertically pivotally supported on a vertical axis offset forwardly of the aforesaid vertical axis; means connecting the plow bottoms and said wheel frame so that the plow bottoms and wheel frame shift angularly in unison; power means on the main frame connected to and for shifting said plow bottoms so as to selectively adjust the width of cut of said bottoms; and master and slave cylinders connectible respectively between the tractor and plow and said wheel frame and wheel assembly for angularly adjusting the wheel in response to relative lateral swinging movement between the tractor and plow whereby the steering adjustment of said wheel assembly is a function of the angular relation between the tractor and plow as sensed by the master cylinder and is independent of the relative vertical positions of the main frame and wheel frame.

13. A plow adapted to be pulled by a tractor comprising: a main frame having forward and rear ends; a fore-and-aft extending wheel frame supported at its forward end on the rear end of the plow frame for lateral swinging movement about a substantially vertical axis; a steerable wheel assembly mounted on the rear end of said wheel frame; a hitch structure for connecting the plow frame to a tractor including vertical pivot structure permitting relative lateral swinging between the plow and tractor; a plurality of plow bottoms spaced along a diagonal row on said main frame, each being vertically pivotally supported thereon and with the rearmost plow bottom being vertically pivotally supported on a vertical axis offset forwardly of the aforesaid vertical axis; means connecting the plow bottoms and said wheel frame so that the plow bottoms and said wheel frame shift laterally in unison on said main frame; means on the main frame connected to and for shifting said plow bottoms so as so selectively adjust the width of cut of said plow bottoms; and a master cylinder connected respectively to said hitch structure for sensing relative lateral swinging between the plow and tractor and a slave cylinder connected to and responsive to adjustment of the master cylinder and extending between said wheel frame and wheel assembly for steering the latter in response to relative lateral movement between the tractor and plow frame.

14. A plow adapted to be pulled by a tractor comprising: a plow frame having forward and rear ends; a plurality of plow bottoms spaced along a diagonal row on said plow frame, each being vertically pivotally supported thereon; a fore-and-aft extending wheel frame supported at its forward end on the rear end of the plow frame for lateral swinging movement about a substantially vertical axis offset from the vertical axis about which the rearmost plow bottom is pivotally supported; a steerable wheel assembly mounted on the rear end of said wheel frame for tracking in the furrow left by the rearwardmost plow bottom; a hitch structure for connecting the plow frame to a tractor including vertical pivot structure permitting relative lateral swinging between the plow and tractor; linkage means connecting the plow bottoms and said wheel frame so that the plow bottoms and said wheel frame shift laterally in unison on said plow frame but at different angular amounts; means on the plow frame connected to and for shifting said plow bottoms so as to selectively adjust the width of cut of said plow bottoms; and master and slave cylinders connected respectively to said hitch structure and said wheel frame and wheel assembly for steering the latter in response to relative lateral swinging movement between the tractor and plow frame.

15. The invention described in claim 14 in which said linkage means connects the rearmost plow bottom to said wheel frame and is so arranged and constructed that the wheel of said wheel assembly is shifted outwardly and inwardly with respect to the furrow wall formed by the rearmost plow bottom as the cuts of the plow bottoms are increased and decreased respectively.

16. The invention described in claim 14 in which said master and slave cylinders are so arranged and constructed that angle of the lead of the wheel of said steerable wheel assembly increases and decreases respectively as the plow bottoms are adjusted to wider and narrower cuts.

17. A plow adapted to be pulled by a tractor comprising: a plow frame having forward and rear ends with said forward end being pivotally connected to the tractor for shifting about a vertical axis; a plurality of plow bottoms vertically pivotally mounted from front to rear on the plow frame; means interconnecting the plow bottoms to cause said plow bottoms to pivot in unison through a range having an infinite number of positions; means on said frame for adjusting the angular positions of the plow bottoms; a wheel frame vertically pivotaly connected to the rear end of said plow frame rearwardly of the rearmost plow bottom and extending rearwardly therefrom to a rear end; a steering wheel assembly carried on the rear end of said wheel frame having a wheel in tracking relation to the rearmost plow bottom; link means connecting the plow bottoms to said wheel frame and capable of shifting said wheel frame through a range having an infinite number of laterally offset positions with respect to the furrow wall cut by the rearmost plow bottoms, each of said positions being correlated to an angular position of said plow bottoms; a hydraulic master cylinder positioned to sense lateral shifting of said plow frame relative to said tractor in response to varying landside forces against the plow bottoms as said bottoms are angularly adjusted; a slave cylinder responsive to extension or retraction of the master cylinder and extending between the wheel frame and steering wheel assembly to cause the wheel of said assembly to vary its lead as said master cylinder extends and retracts.

18. The invention described in claim 17 in which the link means connecting the plow bottoms to the wheel frame is a four bar linkage, one link of which is a portion of the main frame between the vertical pivots of the rearmost plow bottom and the wheel frame, two links of which are arms connected to and for swinging on the respective pivots with the rearmost plow bottom and wheel frame, and a connecting link interconnecting the arms.

19. The invention described in claim 18 further characterized by at least one of the links of the four bar linkage being adjustable for purposes of varying the effective throw of the linkage.

20. The invention described in claim 17 in which the wheel assembly includes a spindle inclined to the vertical so that an extension of the axis thereof would intersect the ground in the area of ground contact of the wheel.

21. The invention described in claim 17 in which the link means is so arranged and constructed so as to shift the wheel frame laterally with respect to the furrow wall left by the rearmost plow bottom greater and lesser distances as the bottoms are angularly adjusted to increase and decrease respectively the width of cuts of said bottoms.

22. The invention described in claim 17 in which the master and slave cylinders are so arranged and constructed that the lead of the wheel of said wheel assembly are increased and decreased with respect to the plowed ground as the plow bottoms are angularly adjusted to increase and decrease respectively the width of cuts of said bottoms.

23. A plow adapted to be pulled by a tractor comprising: a main frame extending diagonally with respect to the direction of travel between forward and rear ends; a fore-and-aft extending wheel frame supported at its forward end on the rear end of the main frame for lateral swinging movement about a substantially vertical axis; a wheel assembly on the rear end of said wheel frame; a wheel mounted on the spindle, a hitch structure for connecting the main frame to a tractor including a forward portion mountable on the three points of a three-point hitch of a tractor, a rear portion connectible to the main frame and shiftable therewith, and a structure connecting the forward and rear portions including a forwardly positioned vertical pivot permitting relative lateral swinging between the portions and a transverse horizontal pivot offset rearwardly from the vertical pivot permitting relative vertical movement between the portions; a plurality of plow bottoms spaced along said main frame, each being vertically pivotally supported thereon; means connecting the plow bottoms and said wheel frame so that the plow bottoms and said wheel frame shift laterally on said main frame in unison; power means on the main frame connected to and for shifting said plow bottoms so as to selectively adjust the width of cut of said plow bottoms; and a hydraulic master cylinder extending between the forward portion of said hitch structure and the structure connecting the front and rear portions and connected to the structure in the offset between the vertical and horizontal pivots; and a slave cylinder extending between the frame and wheel assembly angularly adjusting the latter in response to extension and retraction of the master cylinder.

24. A plow adapted to be pulled by a tractor comprising: a main frame extending diagonally with respect to the direction of travel between forward and rear ends; a fore-and-aft extending wheel frame supported at its forward end on the rear end of the main frame for lateral swinging movement about a substantially vertical axis; a wheel assembly on the rear end of said wheel frame; a hitch structure for connecting the main frame to a tractor including a forward portion mountable on the three points of a tractor three-point hitch, a rear portion connectible to the main frame and shiftable therewith, and a rigid member connecting the forward and rear portions including a vertical pivot between the portions and a transverse horizontal pivot permitting relative vertical movement between the portions; a plurality of plow bottoms spaced along said main frame, each being vertically pivotally supported thereon; means connecting the plow bottoms and said wheel frame so that the plow bottoms and said wheel frame shift laterally on said main frame in unison; power means on the main frame connected to and for shifting said plow bottoms so as to selectively adjust the width of cut of said plow bottoms; and a hydraulic master cylinder extending between the forward portion of said hitch structure and the rigid member; and a slave cylinder extending between the frame and wheel assembly for angularly adjusting the latter in response to extension and retraction of the master cylinder.

25. The invention described in claim 24 in which the rear portion of the hitch structure is a fore-and-aft extending hitch beam connected at its rear end by vertical pivot means to the main frame intermediate the frame's front and rear ends and at its front end to the horizontal pivot of the rigid member, and further characterized by adjusting means between the main frame and the hitch beam for adjustably positioning the front plow bottom transversely and with respect to the rear wheel of a tractor.

26. A plow adapted to be pulled by a tractor comprising: a plow frame having forward and rear ends with said forward end being pivotally connected to the tractor for shifting about a vertical axis; a plurality of plow bottoms vertically pivotally mounted from front to rear on the plow frame; means interconnecting the plow bottoms to cause said plow bottoms to pivot in unison through a range having an infinite number of positions; means on said frame for adjusting the angular positions of the plow bottoms; a wheel frame vertically pivotally connected to the rear end of said plow frame rearwardly of the rearmost plow bottom and extending rearwardly therefrom to a rear end; a steering wheel assembly carried on the rear end of said wheel frame having a wheel in tracking relation to the rearmost plow bottom; means connected to said wheel frame and capable of shifting said wheel frame through a range having an infinite number of laterally offset positions with respect to the furrow wall cut by the rearmost plow bottom as the plow bottom moves through its range of angular positions, each of said offset positions being correlated to an angular position of said plow bottoms; a means sensing lateral shifting of said plow frame relative to said tractor as said bottoms are angularly adjusted; and a steering mechanism connected to said wheel and responsive to said means sensing lateral shifting of said plow frame relative to the tractor to cause the wheel of said assembly to vary its lead for each angular position of the plow bottoms.

27. A plow adapted to be pulled by a tractor comprising: a plow frame having forward and rear ends with said forward end being pivotally connected to the tractor for shifting about a vertical axis; a plurality of plow bottoms vertically pivotally mounted from front to rear on the plow frame; means interconnecting the plow bottoms to cause said plow bottoms to pivot in unison through a range having an infinite number of positions; means on said frame for adjusting the angular positions of the plow bottoms; a wheel frame vertically pivotally connected to the rear end of said plow frame rearwardly of the rearmost plow bottom and extending rearwardly therefrom to a rear end; a steering wheel assembly carried on the rear end of said wheel frame having a wheel in tracking relation to the rearmost plow bottom; means connected to said wheel frame responsive to the means for adjusting said plow bottoms for shifting said wheel frame in unison with the plow bottoms but at different angular amounts and through a range in which its wheel has an infinite number of laterally offset positions with respect to the furrow wall cut by the rearmost plow bottom, each of said offset positions being correlated to an angular position of said plow bottoms; a means sensing lateral shifting of said plow frame relative to said tractor in response to said bottoms being angularly adjusted; and a steering mechanism connected to said wheel and to said means sensing lateral shifting of said plow frame relative to the tractor to cause the wheel of said assembly to vary its lead for each angular position of the plow bottoms.

28. A plow adapted to be pulled by a tractor comprising: a main frame extending diagonally with respect to the direction of travel between forward and rear ends; a fore-and-aft extending wheel frame supported at its forward end on the rear end of the main frame for lateral swinging movement about a substantially vertical axis; a steerable wheel assembly mounted on the rear end of said wheel frame and having a spindle whose axis is in angled relation to the wheel so that an extension of said axis would contact the ground in the area of ground engagement of said wheel; a hitch structure for connecting the main frame to a tractor including a forward portion connectible to a tractor and shiftable therewith, a rear portion connectible to the main frame and shiftable therewith, said forward and rear portions being connected to one another by vertical pivot structure permitting relative lateral swinging between the portions; a plurality of plow bottoms spaced along said main frame, each being vertically pivotally supported thereon; means connecting the plow bottoms and said frame so that the plow and said wheel frame shift laterally in unison on said main frame; power means on the main frame connected to and for shifting said plow bottoms so as to selectively adjust the width of cut of said plow bottoms; and master and slave cylinders connected respectively to the forward and rear portions of said hitch structure and said wheel frame and wheel assembly for adjusting the latter in response to relative lateral swinging movement between the hitch portions.

29. The invention defined in claim 28 further characterized by said wheel frame also being supported on said frame to swing vertically about a horizontal axis, a hydraulic cylinder between the rear end of the main frame and said wheel frame for raising and lowering the main frame to selectively adjust the plow bottoms between working and transport positions, and still further characterized by the axis of said spindle when viewed from the side being also inclined downwardly and rearwardly while in working position and being substantially vertical when said plow is in the transport position.

* * * * *

UNITED STATES PATENT OFFICE
CERTIFICATE OF CORRECTION

Patent No. 4,098,346            Dated    4 July 1978

Inventor(s) Ralph Everette Stanfill, James Gerald Steinbach, Gary Allen Rehn, George Frederick Oelschlaeger and William Wayne Jackson It is certified that error appears in the above-identified patent and that said Letters Patent are hereby corrected as shown below:

Column 9, line 4, delete "and bottoms" and insert --bottoms and--.

Column 12, line 19, delete "so" (second occurrence) and insert --to--.

Column 13, line 7, delete "pivotaly" and insert --pivotally--.

Signed and Sealed this

Seventeenth Day of July 1979

[SEAL]

Attest:

LUTRELLE F. PARKER

Attesting Officer     Acting Commissioner of Patents and Trademarks